United States Patent
Sugiura

[11] Patent Number: 5,935,463
[45] Date of Patent: Aug. 10, 1999

[54] WIRE WELDING METHOD, AND WIRE FIXING JIG

[75] Inventor: Masuo Sugiura, Shizuoka, Japan

[73] Assignee: Yazaki Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/478,366

[22] Filed: Jun. 7, 1995

[30] Foreign Application Priority Data

Jun. 28, 1994 [JP] Japan ..................... 6-146135

[51] Int. Cl.⁶ .................................................. B23K 26/00
[52] U.S. Cl. ........................................................ 219/121.64
[58] Field of Search ....................... 219/121.63, 121.64, 219/121.65, 121.66; 228/173.5; 174/94 R

[56] References Cited

U.S. PATENT DOCUMENTS

| | | |
|---|---|---|
| 3,610,874 | 10/1971 | Gagliano . |
| 3,665,367 | 5/1972 | Keller et al. ............... 219/121.6 X |
| 3,717,842 | 2/1973 | Douglas, Jr. . |
| 3,742,122 | 6/1973 | Blavos et al. . |
| 4,687,264 | 8/1987 | Shuey . |
| 4,692,121 | 9/1987 | Arbogast, Jr. . |
| 4,774,394 | 9/1988 | Lemke . |
| 5,300,755 | 4/1994 | Nishitani et al. . |
| 5,541,365 | 7/1996 | Sugiura et al. ............... 219/121.64 |

FOREIGN PATENT DOCUMENTS

| | | |
|---|---|---|
| 3831394 | 3/1990 | Germany . |
| 5-208287 | 8/1993 | Japan . |

*Primary Examiner*—Gregory Mills
*Attorney, Agent, or Firm*—Sughrue, Mion, Zinn, Macpeak & Seas, PLLC

[57] ABSTRACT

An improvement to a wire welding method is disclosed in which a wire and a base plate, or a pair of wires, are welded together using a laser beam, and to a wire fixing jig employed in the method. The wire welding method includes the steps of bending an end portion of the base plate to form a bent portion in such a manner that the height of at least a portion of the bent portion is 1.0 to 3.0 times the diameter of the wire, abutting the wire against the bent portion, and directing a laser beam to a junction between the bent portion of the base plate and the wire such that the wire is welded to the base plate. The wire fixing jig includes a base portion, and a pair of holding arms extending from the base portion in a lateral direction and separated from each other by a predetermined distance. Each of the holding arms has a retaining pawl at a distal end for retaining the wire.

3 Claims, 4 Drawing Sheets

WIRE WELDING METHOD, AND WIRE FIXING JIG

BACKGROUND OF THE INVENTION

1. Field of the Invention

This invention relates to an improvement of a welding method in which a wire and a plate, or a pair of wires are welded together with a laser beam, and a fixing jig employed in the method.

2. Background

A method of welding a wire to a plate with a laser beam is known in the art. For example, Japanese Patent Application (OPI) No. 107786/1984 (the term "OPI" as used herein means an "unexamined application") discloses a thin wire welding method, illustrated in FIGS. 8 and 9. In the disclosed method, the end portion of a flat plate a is bent to form an upstanding leg portion b (hereinafter referred to as "a bent piece", when applicable), and a thin wire c is welded to the plate by application of a laser beam d. According to the JPA application, the thin wire c and the bent piece b are satisfactorily welded together when the height $h_2$ of the bent piece b of the flat plate a is 0.4 to 1.0 times greater that the diameter $h_1$ of the thin wire c.

However, in the above method a problem occurs in that it is difficult to bridge the thin wire c and the bent piece b of the flat plate a with a sufficient amount of molten metal, and accordingly the resultant weld is not sufficiently high in mechanical strength.

SUMMARY OF THE INVENTION

In view of the foregoing, an object of the invention is to provide a wire welding method which is highly reliable in that the weld is mechanically strong, and to provide a wire fixing jig used in the method.

According to a first aspect of the invention, the foregoing object of the invention has been achieved by a wire welding method in which one end portion of the base plate is bent to form a bent portion in such a manner that the height of at least a portion of the bent portion is 1.0 to 3.0 times greater than the diameter of the wire, and the wire abuts against the bent portion. Under these circumstances, the wire is welded to the bent portion by means of a laser beam so that the molten metal completely bridges the gap between the wire and the bent portion to form a weld of high mechanical strength.

It has been discovered that when the height of the bent portion is smaller than the diameter of the wire, the amount of molten metal is insufficient to achieve high mechanical strength. On the other hand, in the case where the height of the bent portion is more than three times the diameter of the wire, the quantity of the molten metal of the base material and the thermal capacity of the latter are not in balance with the thermal capacity of the wire, which adversely affects the welding operation. Thus, the resultant weld is not high enough in mechanical strength.

Since, according to the invention, the height of the bent portion of the base is 1.0 to 3.0 times the diameter of the wire, multiple reflection of the laser beam occurs between the wire and the bent portion of the base, which improves the laser energy absorbing efficiency. Hence, the welding operation is achieved smoothly and quickly.

According to a second aspect of the invention, a wire fixing jig is provided which includes a base portion, a pair of holding arm portions extending from the base portion in the same direction with a predetermined distance between the holding arm portions, wherein the holding arm portions have retaining pawls at their ends. Due to this arrangement, during the welding operation, the wire is held between the retaining pawls so that the wire will not become displaced from the bent portion.

DETAILED DESCRIPTION OF THE PREFERRED EMBODIMENTS

Figure 1:
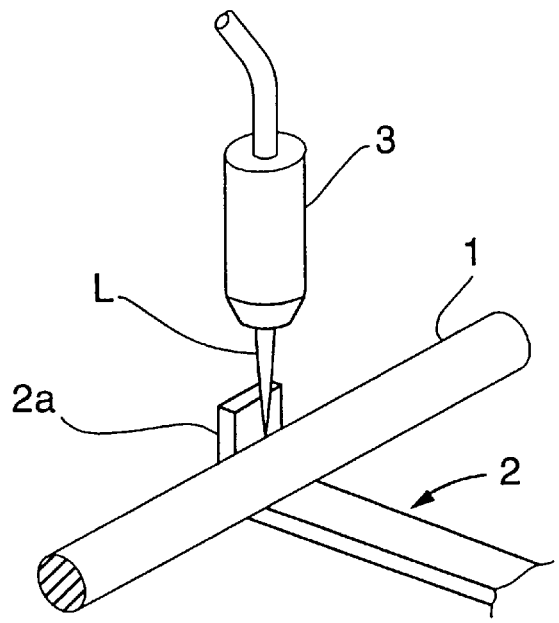
FIG. 1 is a perspective view illustrating a wire welding method, according to a first embodiment of the invention.

FIG. 1 is an explanatory diagram showing a wire welding method, which constitutes an embodiment of the invention.

As shown in FIG. 1, wire 1 is an electric wire which is to be welded to the a base material constituting an elongated electrically conductive metal plate. The wire 1 and the base plate 2 are joined together by application of the laser beam L using a laser 3 where the laser beam is directed to the junction between the wire and the base plate, as shown.

One end portion of the elongated base plate 2 is bent substantially 90° to form a bent portion 2a. According to the invention, the height H of the bent portion 2a and the diameter D of the wire 1 satisfy the following condition:

$$D \leq H \leq 3D$$

Figure 2:
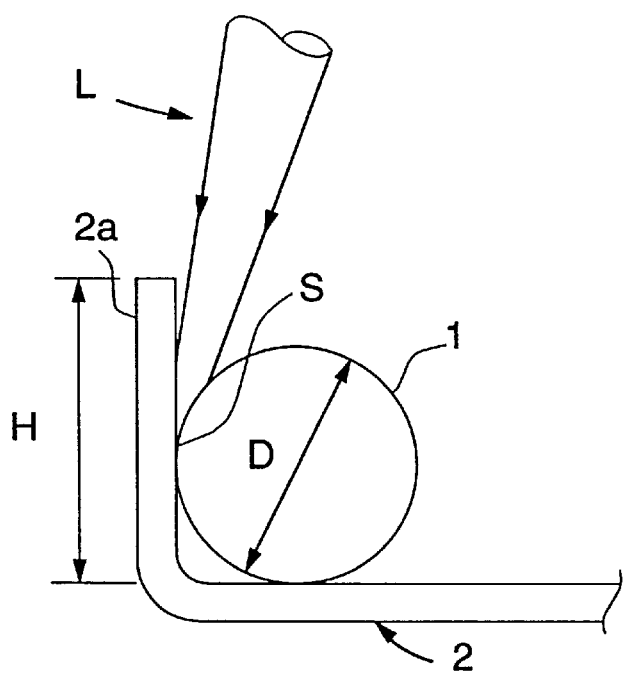
FIG. 2 is a side view illustrating the relationship between the bent portion of the base plate and the wire, shown in FIG. 1.
Figure 3:
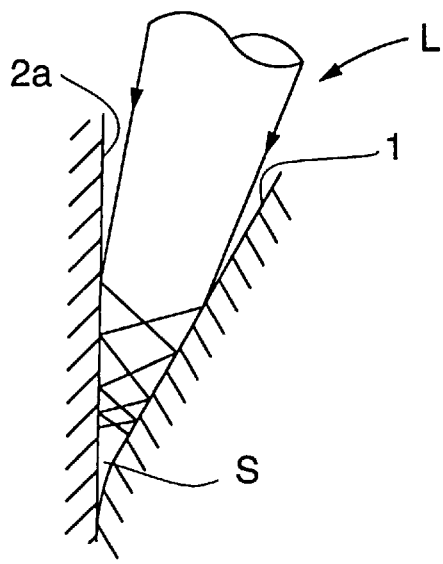
FIG. 3 is a schematical illustration showing the multiple reflection of the laser beam shown in FIG. 2.

It is preferable to apply the laser beam L to the region S where the bent portion 2a abuts against the wire 1, as best illustrated in FIGS. 2 and 3. When the laser beam L is applied to the region S, as shown in FIG. 3, multiple reflection of the laser beam L occurs between the bent portion 2a and the wire 1; that is, it is reflected repeatedly by the bent portion 2a and the wire 1. This multiple reflection minimizes the loss of energy of the laser beam which is caused when the laser beam is reflected outside by the bent portion 2a and the wire 1. Hence, the welding operation can be achieved with less energy; that is, it can be accomplished with high efficiency.

Figure 4:
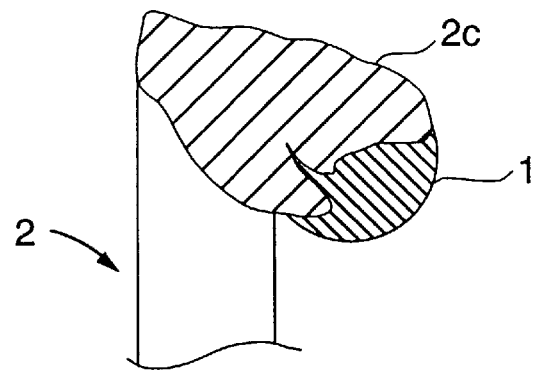
FIG. 4 is a schematical illustration showing the state of the molten metal of the base plate of FIG. 1 which is formed by application of the laser beam.
Figure 5:
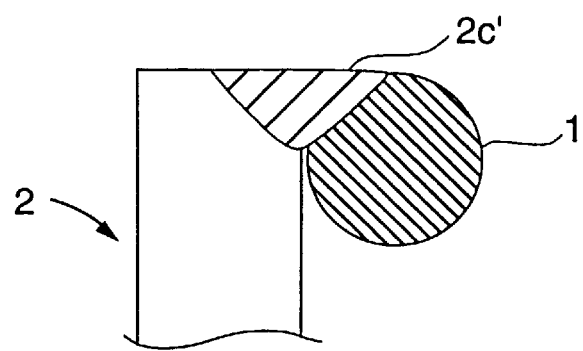
FIG. 5 is a schematical illustration showing the state of the molten metal of the base plate when the height of the bent portion is smaller than the diameter of the wire.

The weld formed by the application of the laser beam L is as shown in FIG. 4. That is, the molten metal 2c of the base 2 is solidified, covering the wire 1. Hence, the wire 1 and the base 2 are positively welded together. On the other hand, in the case where the height H of the bent portion 2a is smaller than the diameter D of the wire 1, as shown in FIG. 5 the quantity of the molten metal 2c is so small that, when solidified, it does not sufficiently cover the wire 1. As such, the strength of the weld is reduced.

Figure 6:
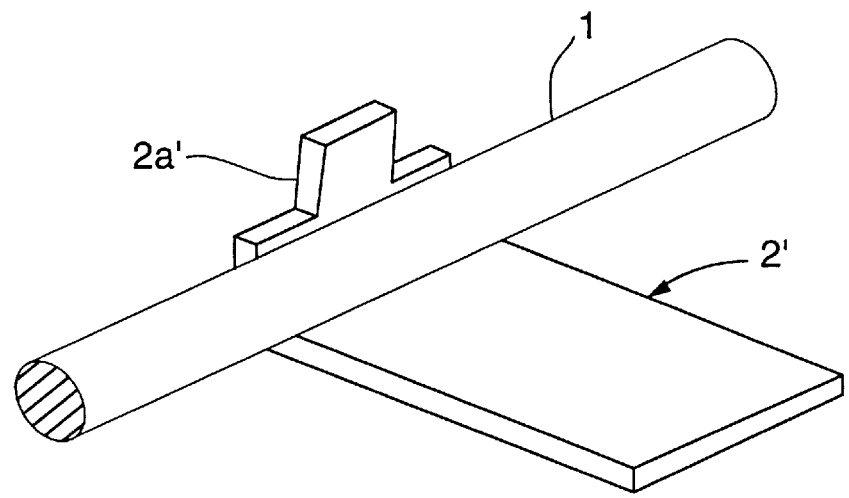
FIG. 6 is a perspective view illustrating the wire welding method where the width of the base plate is relatively large, as compared to the embodiment of FIG. 1.

In the above-described welding method, the base 2 is an elongated metal plate; however, the invention is not limited thereto or thereby. That is, the base 2 may be another wire such as an electric wire. On the other hand, as shown in FIG. 6 the base may be a metal plate 2' having a relatively large width. In this case, the bent portion 2a' may be formed to have a protrusion whose height is 1.0 to 3.0 times the diameter of the wire.

Figure 7:
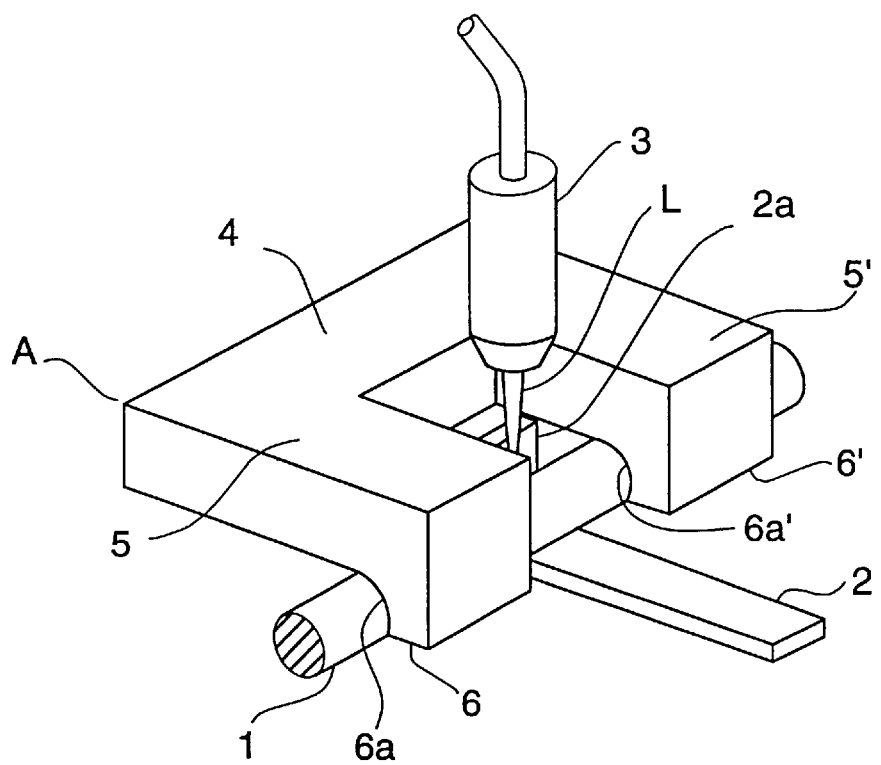
FIG. 7 is a perspective view showing a wire fixing jig employed in the wire welding method of the present invention.
Figure 8:
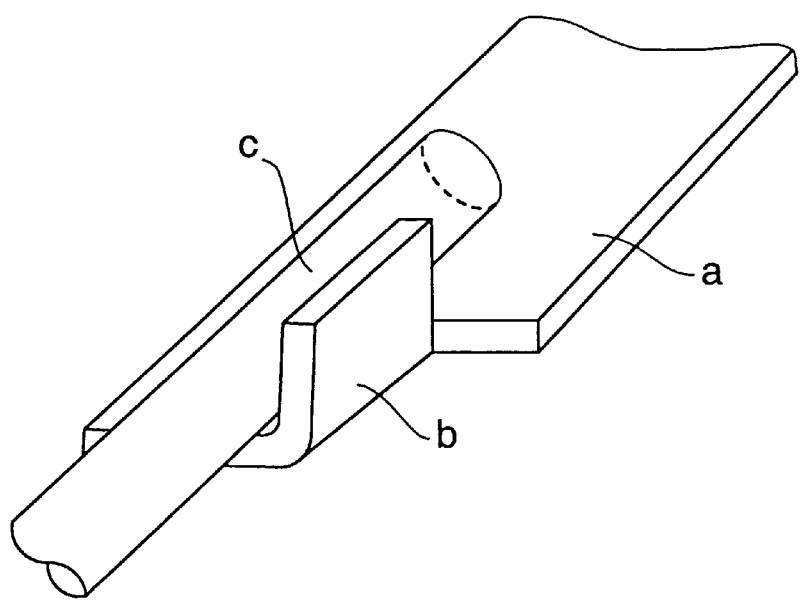
FIG. 8 is a perspective view of a conventional wire welding method.
Figure 9:
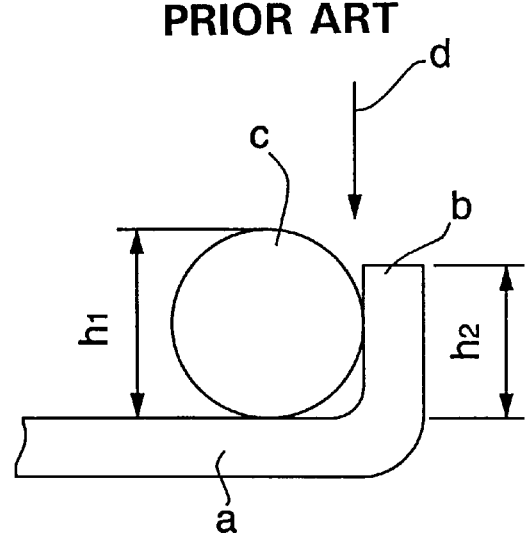
FIG. 9 is a side view illustrating the relationship between the height of the bent piece of the flat plate and the diameter of the wire according to the convention method of FIG. 8.

In the above-described laser welding method, it is preferable to use a wire fixing jig A as shown in FIG. 7 to fix the wire 1 and the base 2 to each other.

The wire fixing jig A is substantially U-shaped, comprising a base portion 4, and a pair of holding arm portions 5 and 5' laterally extending from the base portion 4 in the same direction with a predetermined distance between them. The arm portions 5 and 5' have downwardly extending retaining pawls 6 and 6', respectively, to retain the wire 1. As illustrated, the retaining pawls 6 and 6' have inwardly curved recesses having a radius of curvature corresponding to the diameter of the wire 1 to be secured. The distance between the pair of holding arm portions 5 and 5' may be determined according to the width of a base 2 to be handled.

The wire 1, placed on the bent portion 2a of the base 2, is held by the retaining pawls 6 and 6' of the holding arms 5 and 5', so that the wire 1 is prevented from slipping off the bent portion 2a of the base 2. Hence, the wire and the base are in a stable condition when the laser beam L is emitted from the device 3, thus insuring that the wire and the base are positively welded together.

In the wire welding method of the present invention, the molten metal of the base which is formed by application of the laser beam covers the wire. Hence, after the welding, the molten metal, when solidified, positively bridges the wire and the base; that is, the resultant weld is high in mechanical strength and, therefore more reliable. Since the height of the bent portion is 1.0 to 3.0 times greater than the diameter of the wire, the multiple reflection of the laser beam occurs between the wire and the bent portion of the base, which improves the laser energy absorbing efficiency. Hence, the welding operation is achieved smoothly and quickly; that is, it is markedly improved in productivity.

Using the welding operation with the wire fixing of the present invention, the wire is held by the retaining pawls so that it will not slip off the bent portion of the base. This feature contributes to an improvement in productivity of the wire welding operation.

What is claimed is:

1. A wire welding method in which a wire is welded to a base plate, comprising the following steps:

bending an end portion of said base plate to form a bent portion of a predetermined length in such a manner that the height of at least a portion of said bent portion is 1.0 to 3.0 times the diameter of said wire, said bent portion including a base portion and a projecting portion having a width less than said base portion;

abutting said wire against said bent portion; and directing a laser beam to impinge on said bent portion of said base plate and said wire such that said projecting portion is melted and said wire is welded to said base plate.

2. The method of claim 1, wherein said base plate is another wire.

3. The method of claim 1, wherein said bending step comprises bending said end portion an angle of approximately 90° with respect to said base plate.

* * * * *